(12) United States Patent
Zhang et al.

(10) Patent No.: US 8,566,157 B1
(45) Date of Patent: Oct. 22, 2013

(54) MEDIA ORCHESTRATION DESCRIPTOR WITH AN AUDIT POLICY

(75) Inventors: Wei Zhang, San Jose, CA (US); Sunil Agrawal, Milpitas, CA (US); William Ie, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1546 days.

(21) Appl. No.: 11/850,855

(22) Filed: Sep. 6, 2007

(51) Int. Cl.
*G06Q 30/00* (2012.01)

(52) U.S. Cl.
USPC ............ 705/14.45; 713/150; 705/59; 705/54; 705/51

(58) Field of Classification Search
USPC .......... 705/54, 51, 52, 14.45, 53, 57; 725/46; 348/E7.07; 713/150, 171, 194; 726/27; 380/201; 715/760; 719/328; 386/95
See application file for complete search history.

(56) References Cited

U.S. PATENT DOCUMENTS

| | | | |
|---|---|---|---|
| 6,418,421 B1 * | 7/2002 | Hurtado et al. | 705/54 |
| 6,434,535 B1 * | 8/2002 | Kupka et al. | 705/24 |
| 7,055,166 B1 | 5/2006 | Logan et al. | |
| 2005/0235318 A1 * | 10/2005 | Grauch et al. | 725/46 |
| 2007/0130077 A1 * | 6/2007 | Jagadeesan et al. | 705/59 |
| 2011/0083009 A1 * | 4/2011 | Shamoon et al. | 713/150 |

* cited by examiner

*Primary Examiner* — Behrang Badii
(74) *Attorney, Agent, or Firm* — Kilpatrick Townsend & Stockton LLP

(57) ABSTRACT

Methods and apparatus provide for an event tracker assigns a unique application identifier to represent a relationship between a media publisher and a client application that receives media content from the media publisher. The media publisher organizes the media content according to a media orchestration descriptor. The media orchestration descriptor identifies each segment of the media content and indicating relationships among the segments to define a presentation of the segments of the media content. The event tracker further associates an audit policy with the media orchestration descriptor where the audit policy is defined by the media publisher and received by the client application. The audit policy is applied to the client application in order to locally track events that occur with respect to the presentation of the media publisher's media content via the client application.

23 Claims, 8 Drawing Sheets

MEDIA ORCHESTRATION DESCRIPTOR WITH AN AUDIT POLICY

BACKGROUND

Conventional computer systems allow for the production and distribution of multimedia data, including video, audio and image data. Such production is increasing at a phenomenal rate due to the growing popularity of the Internet, the growing affordability of personal computers capable of efficiently processing multimedia data to provide a pleasing experience for users, as well as the fact that multimedia data is far superior to text-only data in conveying content-rich information.

People now access and use multimedia data in numerous ways. One way that people access multimedia data is over a network. For example, people using web browsers on personal computers now access multimedia data by surfing the World Wide Web via the Internet. Countless numbers of content providers link multimedia data to web pages accessible by people using web browsers. Today, persons using web browsers can access a web page from a web server operated by a content provider to view video clips, listen to audio clips, or view images made available by the content provider.

When a client requests a piece of media content such as digital video, audio, or some other sampled content from a server, the client typically provides the global address of the content in the form of a Uniform Resource Locator (URL). A server then accesses the content and sends or "streams" it to the client as a continuous data stream.

There are various file formats for streaming media content and composite media streams. Regardless of the streaming file format used, an individual data stream may contain a sequence of digital data sets or units. The units can represent an image, sound, or some other stimuli that is perceived by a human to be continuously varying. The client can render the units individually, or in sequence, to reproduce the original stimuli. For example, a video data stream includes a sequence of digitally specified graphics frames that are rendered in sequence to produce a moving picture.

A playlist file, for conventional systems, can contain information such as whether to play certain pieces of media content more than one time, which pieces of media content to play, the order in which to play referenced media content, and the like. Playlist files also can contain references to one or more media streams and describe how pieces of media are to be combined. Playlists do not contain the actual media data, but rather references to the media data. As a result, playlist files are typically small, generally only containing text, and are generally easy and computationally inexpensive to modify. References to a single piece of media may appear in many playlist files.

Conventional playlist files have the effect of combining several individual pieces of media content into one single complex piece of content, and they are important to providers of streaming media. They allow content providers to combine advertisements with other content, and therefore build a business based on advertising revenue. They allow Internet radio stations to create a playlist of broadcast songs. They also allow providers to brand their content by attaching previews or radio-station identifiers before or after the content.

Conventional playlists are implemented either on a client or on a server such as when the client implements a playlist, the playlist is typically downloaded from a server such as a Web server, a file server, and/or the like. The client interprets the playlist file to present a series of requests to one or more servers to access at least a portion of the content represented in the playlist. A server is generally not aware whether the client is requesting content based on a corresponding reference in the currently executed client-side playlist file or whether the client obtains the reference from a source other than a playlist. This is because, from the server's perspective, use of a client-side playlist is indistinguishable from a client communicating a number of non-playlist generated requests to the server to play several different pieces of content one after the other.

SUMMARY

Conventional applications that play content from a content publisher(s) suffer from a number of deficiencies. In particular, as media content from a playlist is played, conventional systems do not allow the publisher of the media content to track specific events (e.g. user interactions) that occur during content playback. Thus, conventional systems cannot provide publishers with data that describe a users' decisions and activities as they consumed particular portions of the media content. Such data would be valuable to publishers in order to create analytics regarding the popularity of their media content, the behavioral tendencies of a target audience, as well their customers' media content consumption habits, preferences and trends.

In addition, conventional systems fail to provide a reliable approach for authenticating such data. This data would be valuable to publishers on the condition that data tampering can be mitigated. If data tampering were to occur, then a publisher's analytics would be skewed, thereby providing an inaccurate impression of how the media content is being consumed in the marketplace. A high probability of skewed analytics negates the value of capturing the users' decisions and activities with regard to consumption of portions of the publisher's media content. Thus, it is essential that the integrity of the data can be maintained.

Embodiments disclosed herein can significantly overcome such deficiencies and/or other deficiencies in the prior art. The embodiments herein provide an event tracker that allows for recording events that occur during media content consumption, verifying the authenticity of such recorded events, as well as transmitting the authenticated, recorded events to a media publisher.

According to general embodiments, the event tracker assigns a unique application identifier to represent a relationship between a media publisher and a client application that receives media content from the media publisher. The media publisher organizes the media content according to a media orchestration descriptor (hereinafter MOD). The media orchestration descriptor identifies each segment of the media content and indicating relationships among the segments to define a presentation of the segments of the media content. The event tracker further associates an audit policy with the media orchestration descriptor where the audit policy is defined by the media publisher and received by the client application. The audit policy is applied to the client application in order to locally track events that occur with respect to the presentation of the media publisher's media content via the client application.

The events to be tracked are defined in the MOD's audit policy. Such events can be activities that occur with regard to a feed of the publisher's media content, an advertisement, and/or user interactions. The event tracker can detect an occurrence of an event and create a record (which includes event data) for the detected occurrence of that event. A unique record identifier for the record is generated and stored with the record in storage local to the user's client application.

In addition, the event tracker defines a batch as a collection of stored records in storage local to the client application, such as a database. Like the events that are tracked. A unique batch identifier for the batch and stored records are collected for the batch. The event tracker then transmits the batch of records, along with the unique batch identifier and the unique application identifier, to the media publisher. Upon receipt of an acknowledgment from the media publisher, the event tracker deletes the transmitted records (i.e. the records that were placed in the batch) from storage.

Such embodiments herein further ensure authentication of the event records. The event tracker maintains a secure file, which includes a hash key, a minimum record identifier, a maximum record identifier and a pending list. The pending list indicates the stored records that have been transmitted to the media publisher in an unacknowledged batch.

When the event tracker is storing a new event record, a field for that record is created and associated with the newly added record. This field is intended for holding a hash value that corresponds with the record. A function can be utilized on the record's event data and the hash key to derive the record's hash value. The event record then updates the maximum record identifier in the secure file to reflect the newly added record.

To further authentication, when collecting the records for a batch, the event tracker recalculates the hash value for each record that is to placed in the batch. The recalculated hash value for each record that is compared with each record's corresponding stored hash value. Thus, the stored hash value and the recalculated hash value will be equal only if the record's event data has not be altered or deleted.

The event tracker assigns records to the batch when the recalculated hash value for each record is equal to the record's corresponding stored hash value. If a particular record's hash values (i.e. the recalculated and stored hash values) are conflicting, then that record will not be included in a batch for transmission to a publisher and can also be deleted. Once the batch with the authenticated records is transmitted to the media publisher, the pending list is updated to reflect the records assigned to the batch.

Other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides an interface with distinct interaction models as explained herein that when performed (e.g. when executing) on the processor, operates as explained herein within the computerized device to perform all of the method embodiments and operations explained herein as embodiments of the invention. Thus, any computerized device that performs or is programmed to perform the processing explained herein is an embodiment of the invention.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Adobe Systems, Incorporated of San Jose, Calif.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Methods and apparatus provide for an event tracker that allows for recording events that occur during media content consumption, verifying the authenticity of such recorded events, as well as transmitting the authenticated, recorded events to a media publisher.

Figure 1:
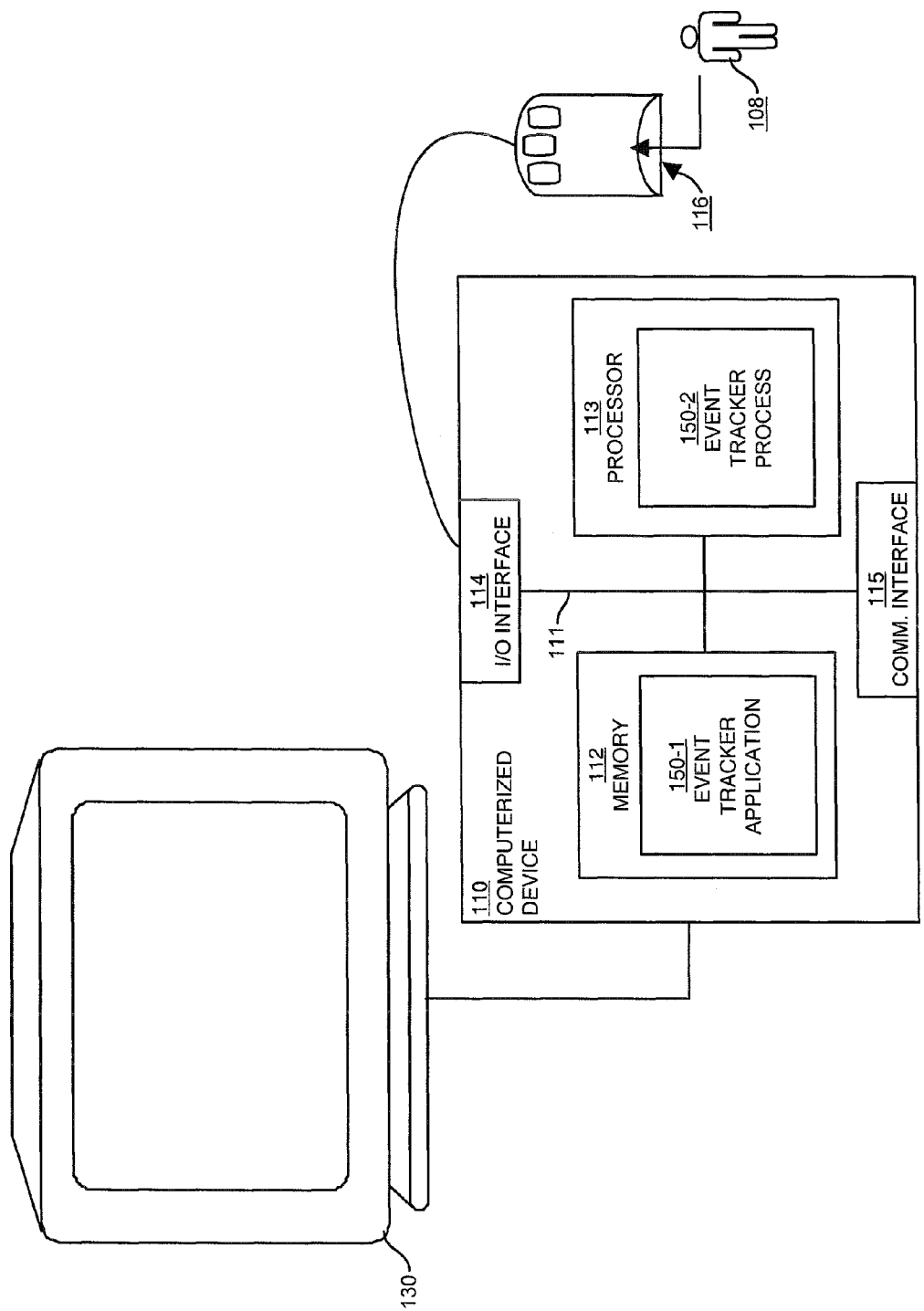
FIG. 1 is a block diagram of a computer system configured with an event tracker according to embodiments herein.

Turning now to FIG. 1, a block diagram illustrates an example of architecture for a computer system 110 that executes, runs, interprets, operates or otherwise performs an event tracker application 150-1 and/or event tracker process 150-2 (e.g. an executing version of the application 150-1 controlled by user 108) according to embodiments herein. The computer system 110 may be any type of computerized device such as a personal computer, a client computer system, workstation, portable computing device, console, laptop, network terminal or the like.

As shown in the present example, the computer system 110 includes an interconnection mechanism 111 such as a data bus, motherboard or other circuitry that couples a memory system 112, a processor 113, an input/output interface 114, and a display 130 presenting a graphical user interface 205 of the event tracker 150. An input device 116 (e.g., one or more user/developer controlled devices such as a keyboard, mouse, touch pad, etc.) couples to the computer system 110 and processor 113 through an input/output (I/O) interface 114. The computer system 110 can be a client system and/or a server system. Further, aspects of the event tracker application 150-1 and/or the event tracker process 150-2 can be distributed over a networked environment.

The memory system 112 can be any type of computer readable medium and, in this example, is encoded with an event tracker application 150-1 that supports generation, display, and implementation of functional operations as will be further explained herein. During operation of the computer system 110, the processor 113 accesses the memory system 112 via the interconnect 111 in order to launch, run, execute, interpret or otherwise perform the logic instructions of the event tracker application 150-1. Execution of the event tracker application 150-1 in this manner produces the event tracker process 150-2. In other words, the event tracker process 150-2 represents one or more portions or runtime instances of the event tracker application 150-1 (or the entire application 150-1) performing or executing within or upon the processor 113 in the computerized device 110 at runtime.

Those skilled in the art will understand that the computer system 110 may include other processes and/or software and hardware components, such as an operating system not shown in this example. A display 130 need not be coupled directly to computer system 110. For example, the event tracker application 150-1 can be executed on a remotely accessible computerized device via the network interface 115. In this instance, the graphical user interface 104 may be displayed locally to a user 108 of the remote computer, and execution of the processing herein may be client-server based.

During operation of the computer system 110, the processor 113 accesses the memory system 112 via the interconnect 111 in launch, run, execute, interpret or otherwise perform the logic instructions of the event tracker application 150-1. Execution of the event tracker application 150-1 in this manner produces processing functionality in an event tracker process 150-2. In other words, the event tracker process 150-2 represents one or more portions or runtime instances of the event tracker application 150-1 (or the entire targeted advertisement application 150-1) performing or executing within or upon the processor 113 in the computerized device 110 at runtime.

Figure 2:
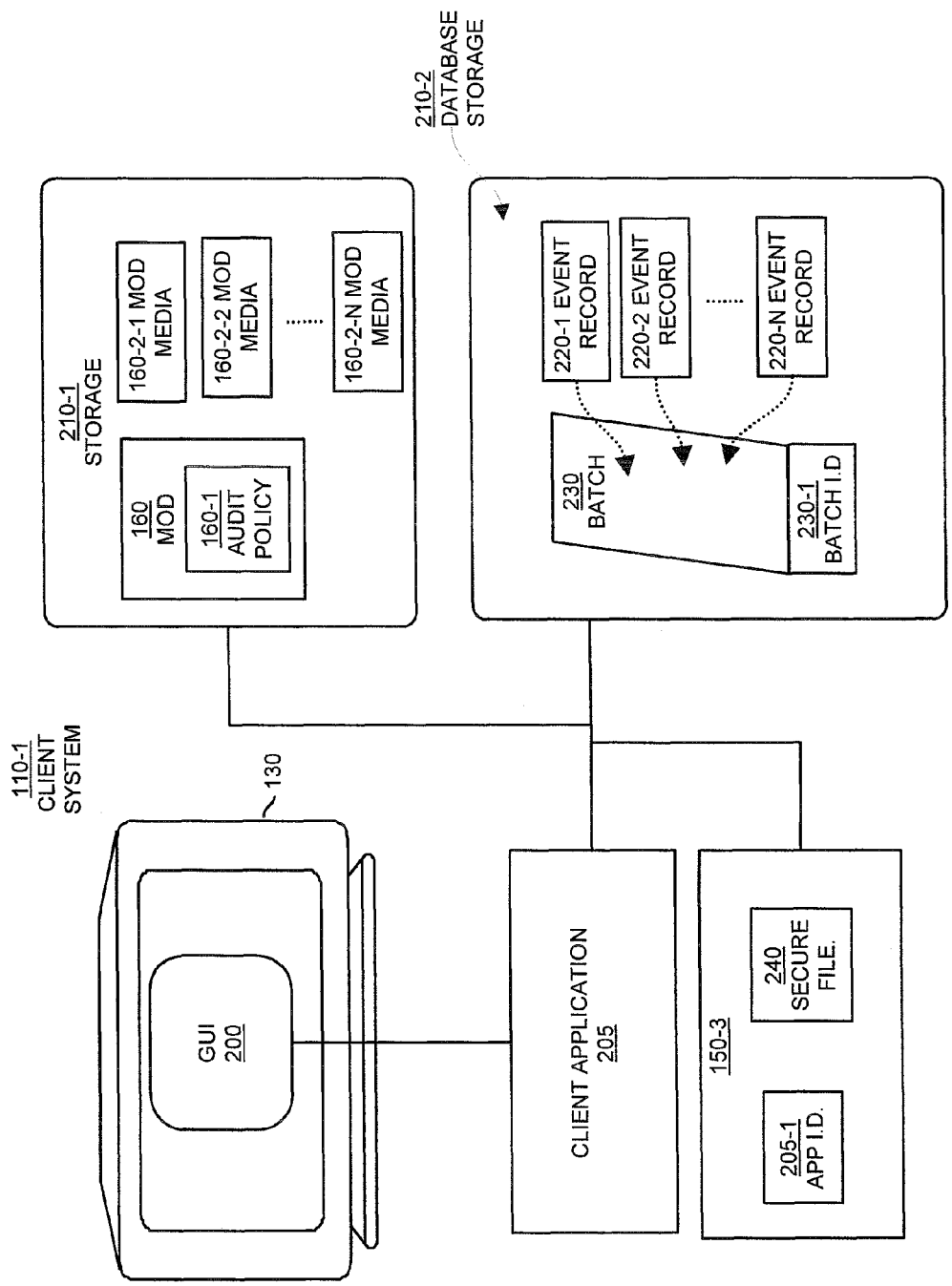
FIG. 2 is a block diagram of a client system configured with an event tracker according to embodiments herein.

FIG. 2 is a block diagram of a client system 110-1 configured with an event tracker 150 according to embodiments herein. FIG. 2 includes the display 130 with a graphical user interface 220 related to a client application 205 (such as a media player) that is presenting media content identified by a MOD 160 that was received from a media publisher. The MOD 160 is associated with an audit policy 160-2, and describes the presentation of a plurality of media segments 160-2-1, 160-2-2 . . . 160-2-N. The MOD 160 and the media segments 160-2-1, 160-2-2 . . . 160-2-N can be downloaded from the media publisher and held in storage 210-1 of the client system 110-1.

The client system 110-1 further includes database storage 210-2 that stores event records 220-1, 220-2 . . . 220-N that can be collected into a batch 230 of records, Each batch 230 is assigned a unique batch identifier 230-1 and each record placed in the batch will be associated with the unique batch identifier 230-1. One or more aspects of the event tracker 150-3 can reside on the client system 110-1, which can pertain to the generation and maintenance of a unique application identifier 205-1 for the client application 205, as well as a secure file 240 used for authenticating the event records 220-1, 220-2 . . . 220-N. It is understood that FIG. 2 relates specifically to FIG. 3 and generally to all other embodiments and figures of the event tracker 150.

Figure 3:
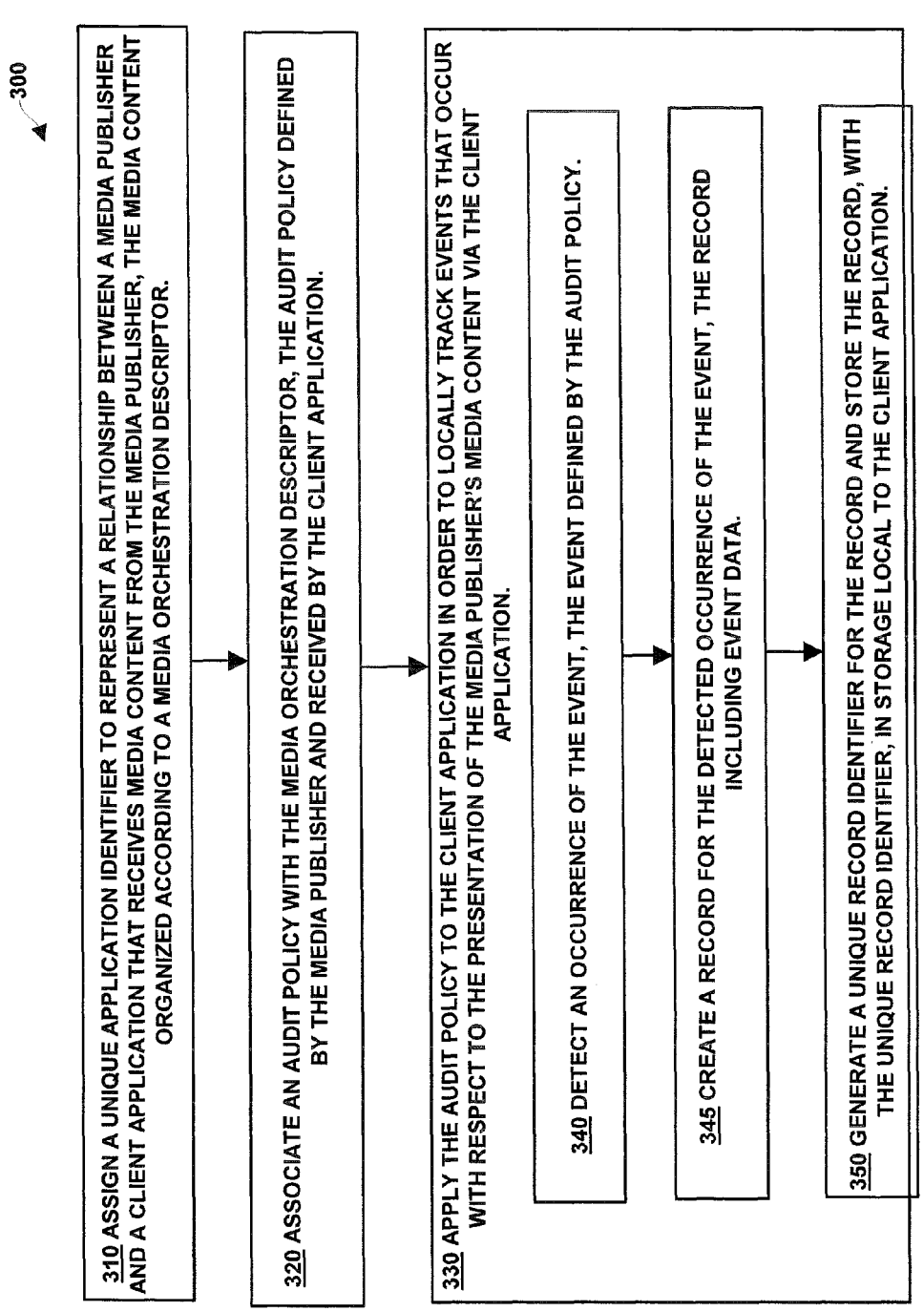
FIG. 3 is a flowchart of processing steps performed by an event tracker to track events with respect to presentation of a media publisher's media content according to embodiments herein.

FIG. 3 is a flowchart 300 of processing steps performed by an event tracker 150 to track events with respect to a presentation of a media publisher's media content according to embodiments herein. At step 310, the event tracker 150 assigns a unique application identifier 205-1 to represent a relationship between a media publisher and a client application 205 that receives media content 160-2-1, 160-2-2 . . . 160-2-N from the media publisher, the media content 160-2-1, 160-2-2 . . . 160-2-N organized according to a media orchestration descriptor 160. The unique application identifier 205-1 can be generated according to a hash function that utilizes client device 110-1 characteristics and the uniform resource locator (URL) of the media publisher. The unique application I.D. 205-1 can be maintained against versions of the client application 205. Thus, the unique application I.D. 205-1 will not be altered as the user 108 updates the client application 205.

At step 320, the event tracker 150 associates an audit policy with the media orchestration descriptor, the audit policy defined by the media publisher and received by the client application. The audit policy 160-1 can have a defined lifetime that describes when the audit policy 160-1 is to be applied to the client application and when the audit policy 160-1 is terminated. In addition, an upload interval can be defined to describing an interval how often the event tracker 150 can transmit batches of records to media publisher.

At step 330, the event tracker 150 applies the audit policy 160-1 to the client application 205 in order to locally track events that occur with respect to the presentation of the media publisher's media content 160-2-1, 160-2-2 . . . 160-2-N via the client application 205.

At step 340, the event tracker 150 detects an occurrence of the event, the event defined by the audit policy. For example, if the MOD 160 is providing the user 108 with a list of various video episodes, the event tracker 150 will detect when the user 108 selects an episode icon to play that particular episode. Such a "play" event is a type of event that is tracked by the event tracker 150.

At step 345, the event tracker 150 creates a record for the detected occurrence of the event, the record including event data. Thus, a record of the "play" event is created which includes various event data, such as the date and time of the event, the user's 108 I.D., the episode size, etc. Each "event" record stored in the database will have a hash value field, in addition to event data fields. Event data held in each record can be, for example, the record I.D., client cookie, event type, event name, time, timezone, etc. The value of the hash value field is calculated based on the values of the event data.

The event tracker 150 can track feed events, advertisement events, and user interactions. Feed events describe events at the client application 205 that are related to a media feed received by the client application 205 from the media publisher according to the MOD 160. Feed events that are to be detected and recorded include a feed subscription event, a feed unsubscription event, a check for update event, a check for update complete event, a start download event, a download completed event, and a download error event.

Advertisement events are recorded by the event tracker 150 as well. Advertisement events describing events at the client application 205 that are related to advertisements received by the client application 205 from the media publisher according to the MOD 160. Advertisement events can be a start banner advertisement display event, a stop banner advertisement display event, a start in-roll advertisement event, a midpoint in-roll advertisement event, a complete in-roll advertisement event, a start bug advertisement event, a midpoint bug advertisement event, a complete bug advertisement event, a hover-over advertisement event and a click-on advertisement event.

The event tracker 150 also creates event records 220-1, 220-2 . . . 220-N based on user interactions. The user interaction events describing events at the client application that are related to one or more user interactions with the media content received by the client application from the media publisher according to the media orchestration descriptor. Such user interaction events include a click to play video event, a video complete event, a pause video event, a stop video even, a drag scrub bar event, a play video to end event, a play next video event, a play previous event, a mute event, an unmute event, a minimize window event and a maximize window event.

At step 350, the event tracker 150 generates a unique record identifier for the record and stores the record, with the unique record identifier, in storage local to the client application. The event tracker 150 generates each unique record identifier according to an order that is incremental, contiguous and ascending (e.g. 1200, 1201, 1202, 1203 . . . ). Each event record 220-1, 220-2 . . . 220-N has its own unique record identifier.

Figure 4:
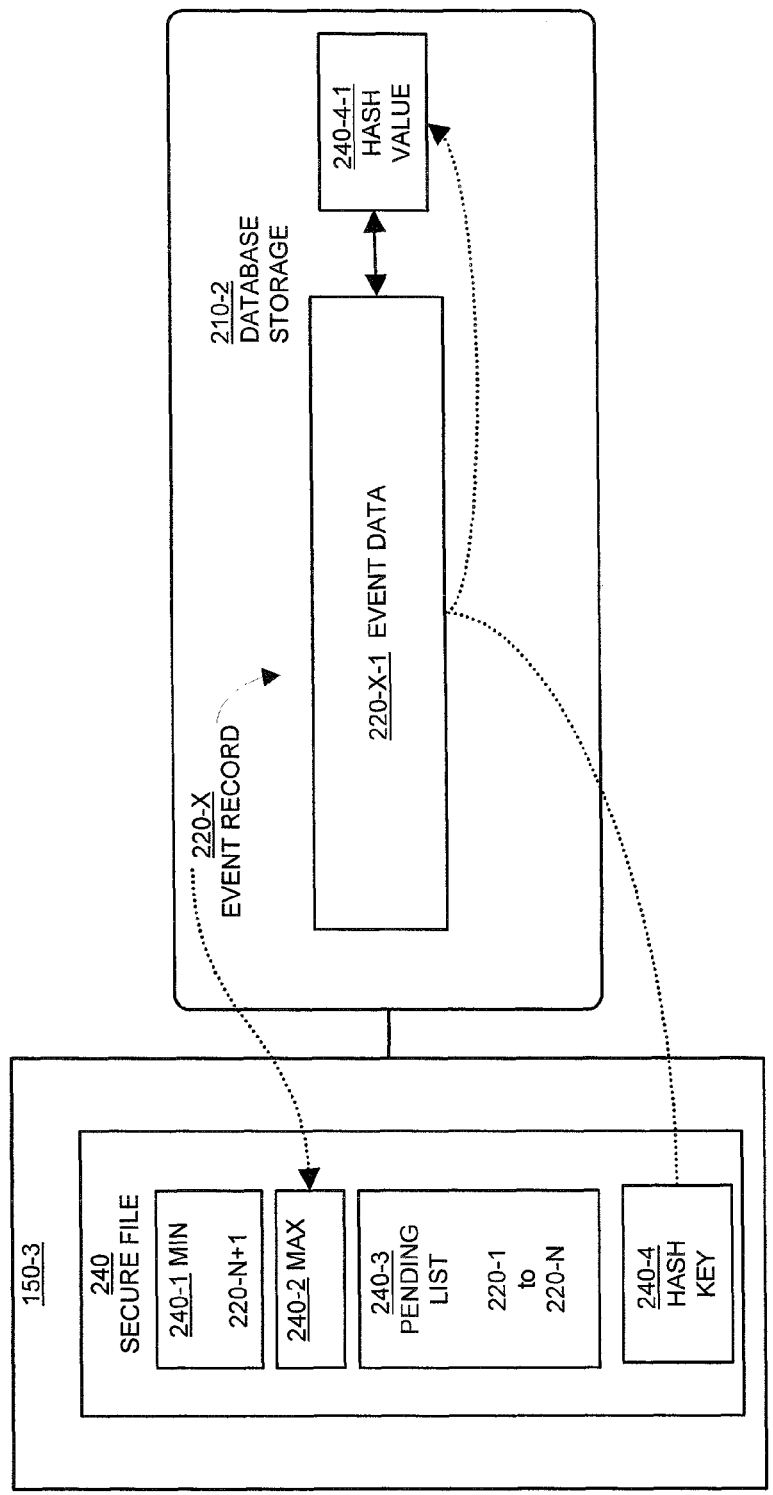
FIG. 4 is a block diagram of a secure file according to embodiments herein.

FIG. 4 is a block diagram of a secure file according to embodiments herein. FIG. 4 includes one or more aspects of the event tracker 150-3 that provides for a secure file 240 that is associated with the media publisher. For each media publisher that interacts with the client application 205, there are three items in the secure file 240: an entry representing the value of the minimum record 240-1 (hereinafter "min"), an entry representing the value of the maximum record 240-2 (hereinafter "max") and the pending list 240-3. The pending list 240-3 indicates the records that have already been transmitted in an unacknowledged batch to the media publisher. Again, it is noted that records IDs are created in an order that is ascending and contiguous. For instance, the following series of record IDs is valid: 23, 24, 25, 26 . . . . However, the following series of records IDs would not be considered valid by the event tracker 150: 43, 23, 24, 25, 26—because it is not contiguous (i.e. 43 is ahead of 23).

Figure 5:
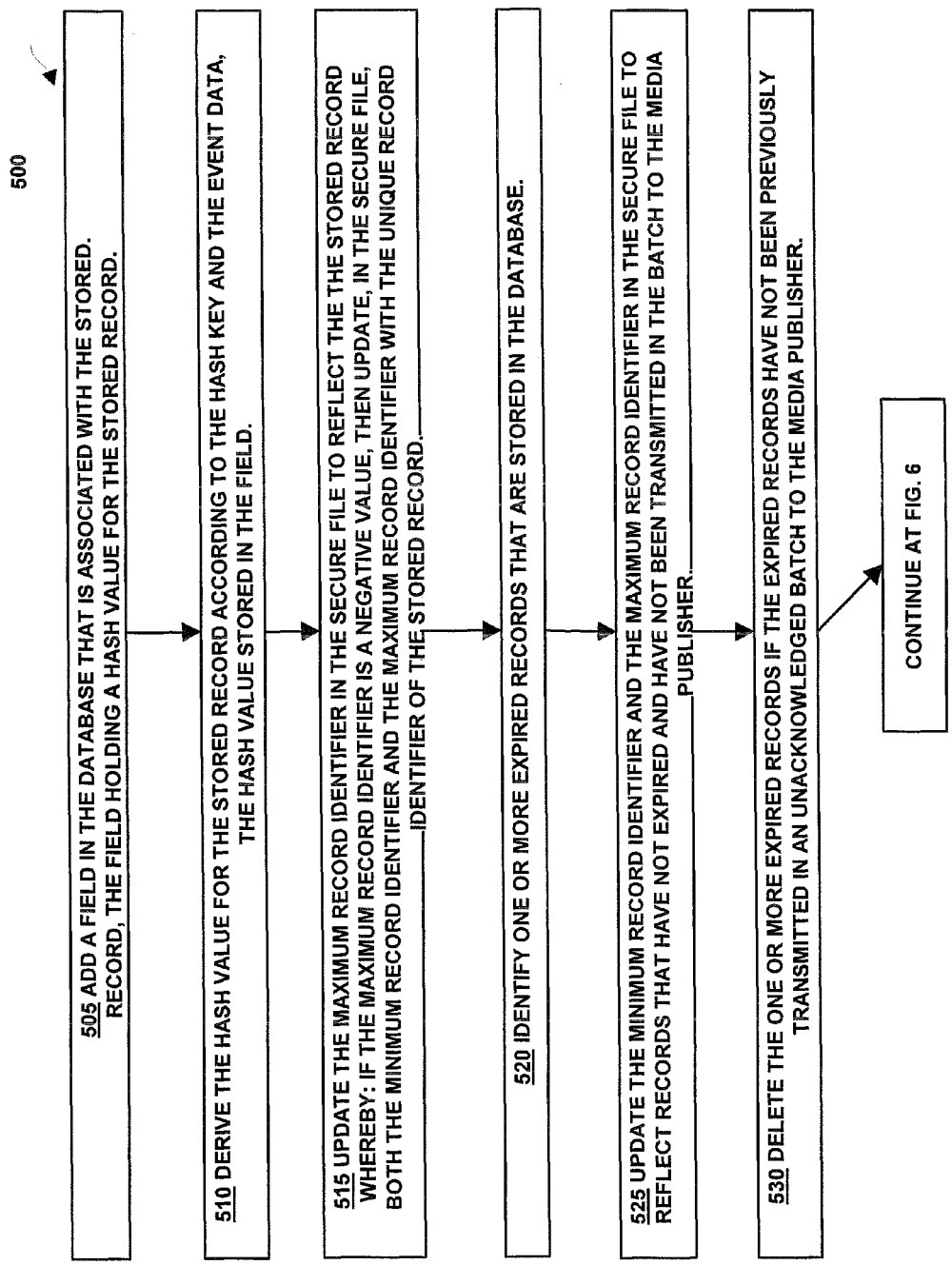
FIG. 5 is a flowchart of processing steps performed by an event tracker to add an event record, to delete an event record and to generate a batch of event records according to embodiments herein.
Figure 6:
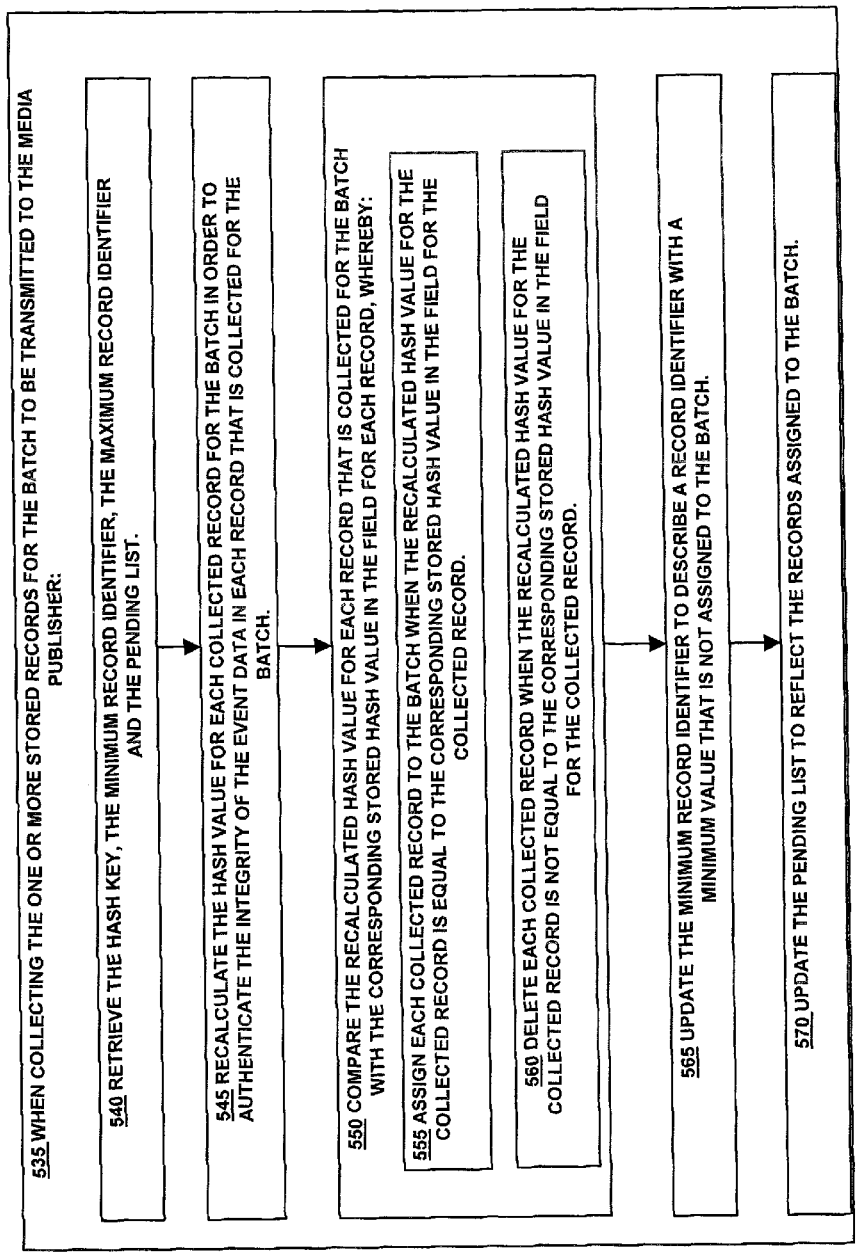
FIG. 6 is a flowchart of processing steps performed by an event tracker to add an event record, to delete an event record and to generate a batch of event records according to embodiments herein.

FIGS. 5 and 6 are flowcharts 500 and 600, respectively, of processing steps performed by an event tracker 150 to add an event record 220-X, to delete an event record and to generate a batch 230 of event records according to embodiments herein. FIGS. 5 and 6 relate specifically to the aspects of the event tracker 150 illustrated in FIG. 4 and generally to all other embodiments and figures of the event tracker 150.

At step 505, the event tracker 150 adds a field in the database that is associated with the stored record, the field holding a hash value for the stored record. At step 510, the event tracker 150 derives the hash value 240-4-1 for the stored record 220-X according to the hash key 240-4 and the event data 220-X-1, the hash value 240-4-1 stored in the field. At step 515, the event tracker 150 updates the maximum record identifier 240-2 in the secure file 240 to reflect the stored record 220-X. If the maximum record identifier 240-2 is a negative value, then the event tracker 150 updates both the minimum record identifier 240-1 and the maximum record identifier 240-2 with the unique record identifier of the stored record 220-X. At step 520, the event tracker 150 identifies one or more expired records that are stored in the database. Such expired records are indicated incrementally, starting from the minimum record identifier 240-1. At step 525, the event tracker 150 updates the minimum record identifier 240-1 and the maximum record identifier 240-2 in the secure file 240 to reflect records that have not expired and have not been transmitted in the batch 230 to the media publisher.

For example, when an event record 220-X is added to the database storage area 210-2, the event tracker 150 calculates a hash value 240-4 for the record 220-X and stores the record 220-X along with the hash value 240-4-1. The hash value of the record is calculated based on the values of event data 220-X-1 in the event record 220-X and the hash key 240-4. Therefore, if a malicious program was to tamper with the event data 220-X-1, such tampering will be detected by the event tracker 150 because the altered event data 220-X-1 would not result in the previously stored hash value 240-1 since the hash algorithm uses the hash key 240-4 with the event data 220-X-1 to calculate the hash value 240-1. It is understood that the hash algorithm used to calculate the hash value 240-1 of each event record 220-X need not be the same hash algorithm used to generate the unique application identifier 205, which can be based on client device 110-1 characteristic(s) and a uniform resource locator of the media publisher.

In FIG. 4, because a new event record 220-X has been added, the min 240-1 and the max 240-2 must be updated to correctly reflect the span of stored records that have not been transmitted to a media publisher. The event tracker 150 retrieves the min 240-1, max 240-2, and the pending List 240-3 from the secure file 240. It then increments the value of max 240-2 if it is not negative. If max 240-2 is negative, it sets the value of min 240-1 and max 240-2 both to be the record ID of event record 220-X. Then, the event tracker 150 stores the newly updated min 240-1, the max 240-2 and the pending list 240-3 back in the secure file 240.

At step 535, the event tracker 150 when collects the one or more stored records for the batch to be transmitted to the media publisher. At step 540, the event tracker 150 retrieves the hash key 240-4, the minimum record identifier 240-1, the maximum record identifier 240-2 and the pending list 240-3. At step 545, the event tracker 150 recalculates the hash value for each collected record for the batch 230 in order to authenticate the integrity of the event data in each record that is collected for the batch. At step 550, the event tracker 150 compares the recalculated hash value for each record that is collected for the batch with the corresponding stored hash value 240-4-1 in the field for each record. At step 555, the event tracker 150 assigns each collected record to the batch 230 when the recalculated hash value for the collected record is equal to the corresponding stored hash value 240-4-1 in the field for the collected record. At step 560, the event tracker 150 deletes each collected record when the recalculated hash value for the collected record is not equal to the corresponding stored hash value 240-4-1 in the field for the collected record. At step 565, the event tracker 150 updates the minimum record identifier 240-1 to describe a record identifier with a minimum value that is not assigned to the batch 230. At step 570, the event tracker 150 updates the pending list 240-3 to reflect the records assigned to the batch 230.

Thus, when it is time for the event tracker 150 to send event records 220-1 . . . 220-N to the media publisher, the event tracker 155 again retrieves the min 240-1, max 240-2, and the pending list 240-3 from the secure file 240. The event tracker 150 seeks to collect a list of records that will be sent to the media publisher in a batch 230. For each record, the event tracker 150 recalculates the hash value. If the recalculated hash value does not match the stored hash value 240-4-1, then the event tracker immediately knows that the event data 220-X-1 has been altered. Otherwise, the event tracker 150 sets a unique batch ID 230-1 to these records (i.e. all transmitted records in the batch 230 will be associated with the same batch ID 230-1) and sends the "batched" records 220-1 ... 220-N to the media publisher. Thus, since the media publisher has yet to send an acknowledgement of batch 230, the pending list 240-3 is reflecting event records 220-1 ... 220-N as "pending". The event tracker 150 can also increment the min 240-1 by the number of records sent. For instance, where an audit policy 160-2 defines a batch 230 to include 50 event records and the following values for min 240-1, max 240-2 and pending list 240-3 are: Min=1200, Max=1260, Pending list=null, then the min 240-1, max 240-2 and pending list 240-3 would read: Min=1250, Max=1260, Pending list=1200/1249–after transmission of records 1200 to 1249.

When the audit policy 160-1 indicates that it is time to delete any expired records, the event tracker 155 again retrieves the min 240-1, max 240-2, and the pending list 240-3 from the secure file 240. The event tracker 150 determines the number of expired stored records and increments the value of min 240-1 accordingly. If all records between min 240-1 and max 240-2 are expired, the event tracker 150 can set both min 240-1 and max 240-2 at −1. Then, the event tracker 150 stores the new values of min 240-1, max 240-2 and the pending list 240-3 back to the secure file 240 and deleted all expired records. For instance, if the following values for min 240-1, max 240-2 and pending list 240-3 are: min=1200, max=1260, pending list=1180 to 1199. If 20 records are expired, then after deletion of the expired records, the min 240-1, max 240-2 and the pending list 240-3 will reflect: Min=1220, Max=1260, Pending list=1180 to 1199. Note the pending list 240-3 is unchanged.

Figure 7:
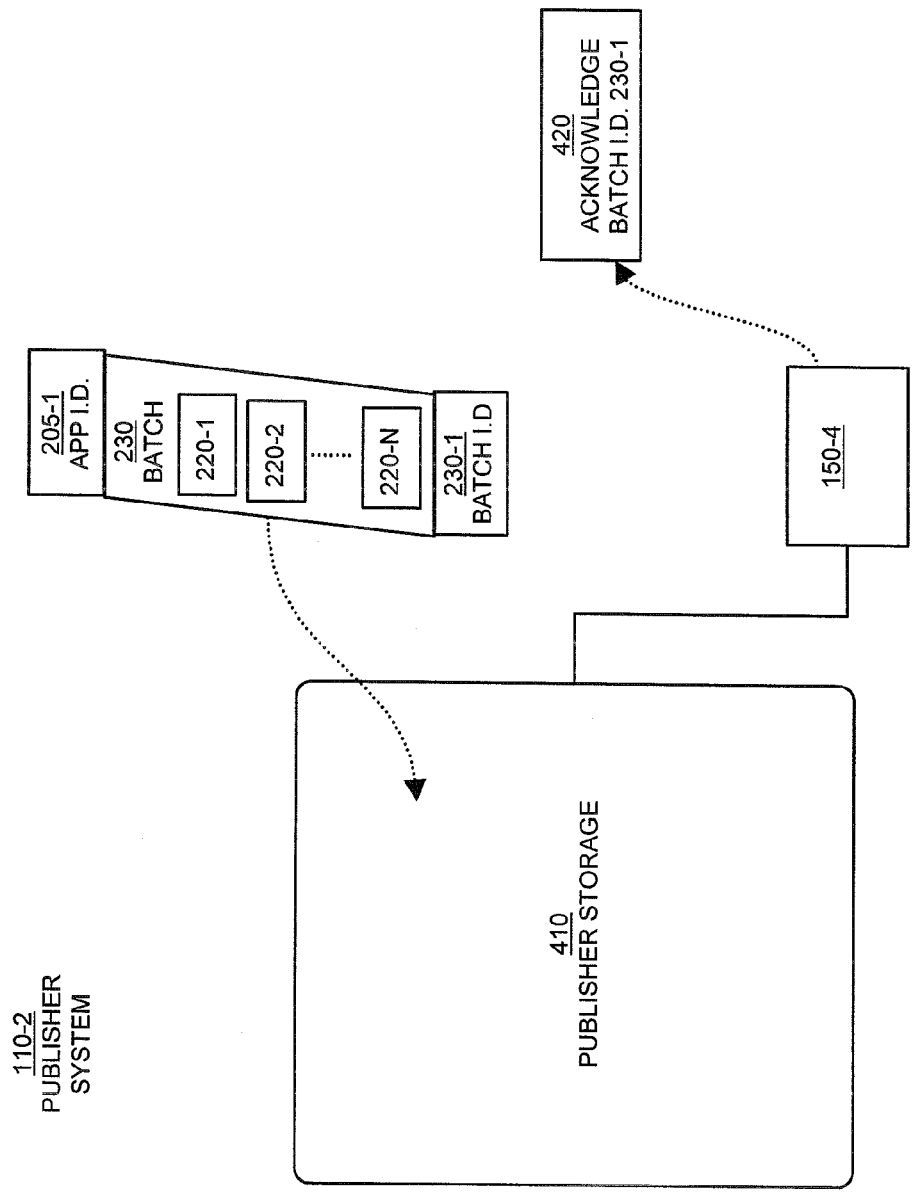
FIG. 7 is a block diagram of a publisher system configured with an event tracker 150 according to embodiments herein.

FIG. 7 is a block diagram of a publisher system 110-2 (e.g. a server system, a media portal) configured with an event tracker 150 according to embodiments herein. The publisher system 110-2 can include storage 610 for receiving a transmitted batch 230 of event records 220-1, 220-1, 220-2 ... 220-N. The batch 230 can be transmitted with the batch I.D. 230-1 and the application I.D. 205-1 so the publisher system 1102 is able to identify the client application 205 as the source of the event records 220-1, 220-1, 220-2 ... 220-N. Also, one or more aspects of the event tracker 150-4 can reside on the publisher system 110-2. It is understood that FIG. 2 and FIG. 4 relate specifically to FIG. 5 and generally to all other embodiments and figures of the event tracker 150.

Figure 8:
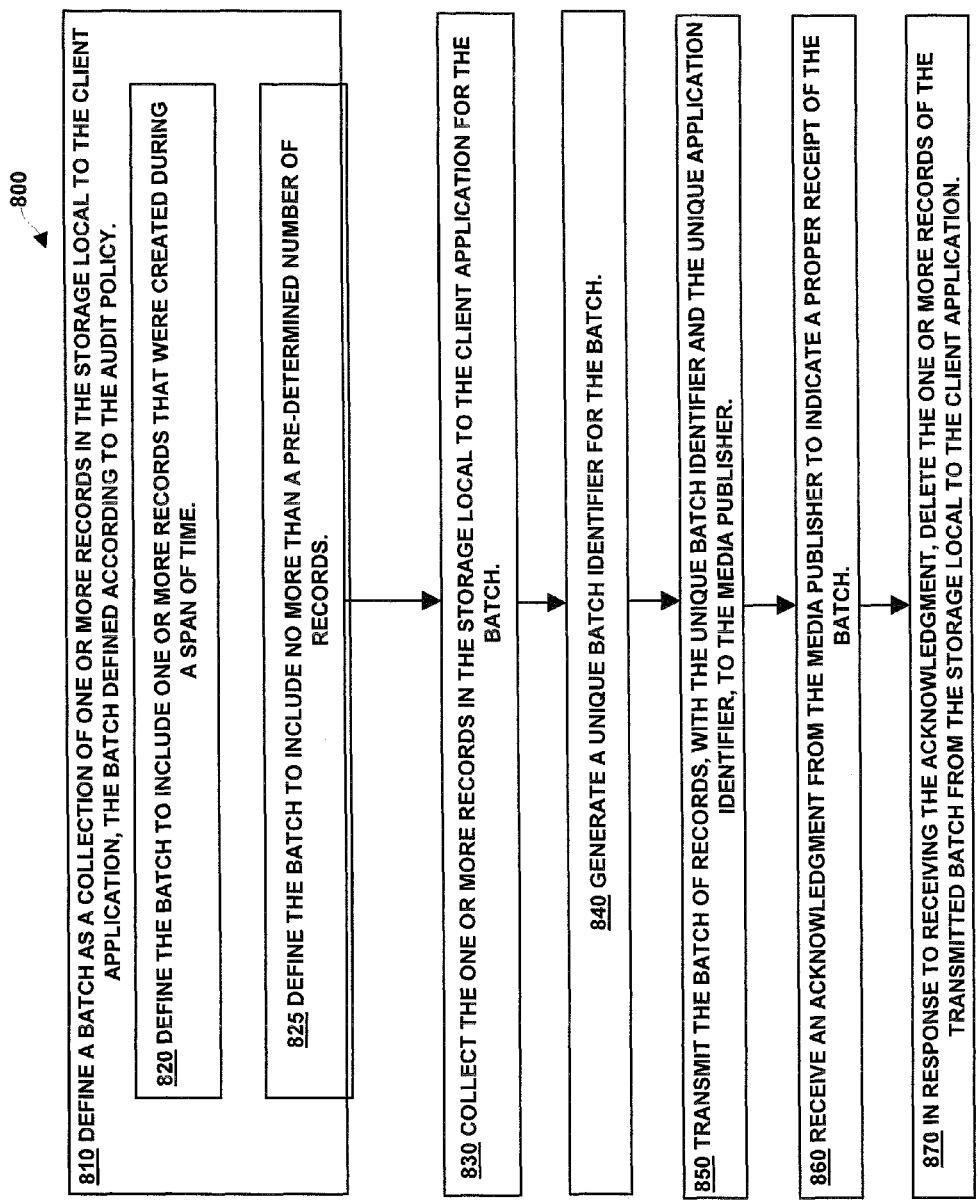
FIG. 8 is a flowchart of processing steps performed by an event tracker to transmit a batch of records to a media publisher according to embodiments herein.

FIG. 8 is a flowchart 800 of processing steps performed by an event tracker 150 to transmit a batch of records to a media publisher according to embodiments herein. At step 810, the event tracker 150 defines a batch 230 as a collection of stored records 220-1, 220-1, 220-2 ... 220-N in storage 210-2 that is local to the client application 205. The batch 230 is defined according to the audit policy 160-1. At step 820, the batch 230 can include one or more records 220-1, 220-1, 220-2 ... 220-N that were created within a span of time. At step 525, the batch 230 can be defined to include no more than a predetermined number of records. At step 830, the event tracker 150 collects the records in the storage local to the client application for the batch.

Furthermore, at step 840, the event tracker 150 generates a unique batch identifier for the batch, thereby associating each record in the batch with the unique batch identifier. At step 850, the event tracker 150 transmits the batch of records, with the unique batch identifier and the unique application identifier, to the media publisher. At step 860, the event tracker 150 receives an acknowledgment from the media publisher to indicate a proper receipt of the batch. At step 870, the event tracker 150, in response to receiving the acknowledgment, deletes the one or more records of the transmitted batch from the storage local to the client application.

When the event tracker 150 receives the acknowledgement 420 from the media publisher, the event tracker 155 again retrieves the min 240-1, max 240-2, and the pending list 240-3 from the secure file 240. Then, the event tracker 150 deletes the records 220-1 ... 220-N that are identified in the pending list 240-3 and sets the pending list 240 to empty (i.e. null). Thus, the event tracker 150 provides for four levels of security: the audit policy protected via a MOD secure signature, storing records in secure storage locally, utilizing a secure transport protocol and deleting records only after receiving acknowledgement of batch receipt.

The following code is an example of a media orchestration descriptor compatible with the event tracker 150 according to embodiments herein.

```
<smil xmlns="http://www.w3.org/2005/SMIL21/Language">
<head>
<layout>
<region id="banner"/>
<region id="content"/>
<region id="logo"/>
</layout>
</head>
<body>
<par>
<seq>
<image region="logo" src="http://contentServer/ads/ad1.jpg" dur="70s"/>
<image region="logo" src="http://contentServer/ads/Pirates3.png" dur="82.149s"/>
</seq>
<seq>
<video region="content" src="http://contentServer/Pirates3-1.flv" dur="20.58s"/>
<video region="content" src="http://contentServer/Pirates3-2.flv" dur="17.07s"/>
<video region="content" src="http://contentServer/Pirates3-3.flv" dur="21.2s"/>
<video region="content" src="http://contentServer/Pirates3-4.flv" dur="31.579s"/>
<video region="content" src="http://contentServer/Pirates3-5.flv" dur="24.88s"/>
<video region="content" src="http://contentServer/Pirates3-6.flv" dur="36.842s"/>
</seq>
<seq>
<image region="banner" src="http://contentServer/ads/ad1.jpg" dur="50s"/>
<image region="banner" src="http://contentServer/ads/ad2.gif" dur="50s"/>
<image region="banner" src="http://contentServer/ads/ad3.jpg" dur="52.149s"/>
</seq>
</par>
</body>
</smil>
```

The MOD can be in an eXtensible markup language (XML) format used for defining media orchestration (i.e. presenting and sequencing of media segments) in a media player. The MOD represents pre-defined user interface regions and media elements (i.e. media segments of the media content) such as, for example, videos, advertisements, graphics and images which are bound to those regions. Tags such as <seq> and <par> further define containers for the media elements to indicate sequential or parallel execution of one or more media elements, respectively. A parallel container in the MOD is denoted by <par> which can include one or more media elements (i.e. media components, media assets, media segments, media effects) of the media content. The duration of a parallel container is calculated as the duration of the longest media elements within the parallel container. For example, if the duration of three videos within a parallel container is 70 seconds, 25 seconds and 55 seconds, respectively, then the duration of the parallel container is calculated to be 70 seconds.

A sequential container, denoted by <seq>, has a duration calculated to be the sum of each duration of media elements within the sequential container. Thus, if the duration of three videos within the sequential container were respectively 70 seconds, 25 seconds and 55 seconds, then the duration of the sequential container is calculated to be 150 seconds.

Timing attributes for the media elements organized in the MOD can be included to indicate when the media elements are played back, such as <begin>, <end> and <dur>. The media elements referenced by the MOD can be downloaded, stored on to a local disk on the user's computer, and/or placed in a buffer that is communicating with the user's media player.

It is noted that example configurations disclosed herein include the event tracker application 150-1 itself (i.e., in the form of un-executed or non-performing logic instructions and/or data). The event tracker application 150-1 may be stored on a computer readable medium (such as a floppy disk), hard disk, electronic, magnetic, optical, or other computer readable medium.

Note again that techniques herein are well suited for an event tracker 150 that allows for recording events that occur during media content consumption, verifying the authenticity of such recorded events (i.e. user interactions, user decisions, user activities), as well as transmitting the authenticated, recorded events to a media publisher. However, it should be noted that embodiments herein are not limited to use in such applications and that the techniques discussed herein are well suited for other applications as well.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing an extensible master-slave user interface with distinct interaction models as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method comprising:
    receiving, by a computing device executing a client application, a media orchestration descriptor, the media orchestration descriptor identifying each segment of a plurality of segments of media content to be received from a media publisher and indicating one or more relationships among the segments to define a visual arrangement and sequence of the segments of the media content;
    receiving, by the computing device, an audit policy associated with the media orchestration descriptor and identifying a plurality of events to be tracked, the plurality of events comprising:
        a feed event comprising an event at the client application related to a media feed received by the client application from the media publisher,
        an advertisement event comprising an event at the client application related to one or more advertisements received by the client application, and
        an interaction event comprising an event at the client application related to one or more interactions received by the client application;
    tracking, by the computing device, the plurality of events identified in the audit policy that occur during presentation of the media content according to the media orchestration descriptor; and
    transmitting, by the computing device, to the media publisher one or more records of the one or more events occurring during the presentation of the media content.

2. The method as in claim 1, wherein tracking comprises:
    detecting at least one occurrence of an event identified in the audit policy;
    creating a record for the detected at least one occurrence of the event, the record including event data;
    generating a unique record identifier for the record; and
    storing the record, with the unique record identifier, in storage local to the client application.

3. The method as in claim 1, wherein the feed event includes at least one of:
    a feed subscription event;
    a feed unsubscription event;
    a check for update event;
    a check for update complete event;
    a start download event;
    a download completed event;
    a download error event;
wherein the advertisement event includes at least one of:
    a start banner advertisement display event;
    a stop banner advertisement display event;
    a start in-roll advertisement event;
    a midpoint in-roll advertisement event;
    a complete in-roll advertisement event;
    a start bug advertisement event;
    a midpoint bug advertisement event;

a complete bug advertisement event;
a hover-over advertisement event;
a click-on advertisement event; and
wherein the interaction event includes at least one of:
a click to play video event;
a video complete event;
a pause video event;
a stop video event;
a drag scrub bar event;
a play video to end event;
a play next video event;
a play previous event;
a mute event;
an unmute event;
a minimize window event; and
a maximize window event.

4. The method as in claim 2, wherein transmitting to the media publisher one or more records of the one or more events occurring during the presentation of the media content comprises:
generating a unique application identifier according to a hash function that utilizes characteristics of the computing device executing the client application;
defining a batch comprising the one or more records in the storage local to the client application for the batch;
generating a unique batch identifier for the batch;
transmitting the batch, with the unique batch identifier and the unique application identifier, to the media publisher;
receiving an acknowledgment from the media publisher to indicate a proper receipt of the batch; and
in response to receiving the acknowledgment, deleting the one or more records of the transmitted batch from the storage local to the client application.

5. The method as in claim 4, wherein defining the batch comprises at least one of:
defining the batch to include one or more records that were created during a span of time; or
defining the batch to include no more than a pre-determined number of records.

6. The method as in claim 2, wherein generating the unique record identifier for the record and storing the record, with the unique record identifier, in storage local to the client application comprises:
generating each unique record identifier according to an order that is incremental, contiguous and ascending;
maintaining a secure file in a database, the secure file associated with the media publisher, and the secure file further comprising:
i) a hash key;
ii) a minimum record identifier, the minimum record identifier describing a record identifier with a minimum value that is stored in the database and has not been transmitted in the batch to the media publisher;
iii) a maximum record identifier, the maximum record identifier describing a record identifier with a maximum value that is stored in the database and has not been transmitted in the batch to the media publisher; and
iv) a pending list, the pending list indicating one or more stored records that have been transmitted in an unacknowledged batch to the media publisher.

7. The method as in claim 6, further comprising:
adding a field in the database that is associated with the stored record, the field holding a hash value for the stored record;
deriving the hash value for the stored record according to the hash key and the event data, the hash value stored in the field; and
updating the maximum record identifier in the secure file to reflect the stored record whereby:
if the maximum record identifier is a negative value, then updating, in the secure file, both the minimum record identifier and the maximum record identifier with the unique record identifier of the stored record.

8. The method as in claim 7, further comprising:
identifying one or more expired records that are stored in the database;
updating the minimum record identifier and the maximum record identifier in the secure file to reflect records that have not expired and have not been transmitted in the batch to the media publisher; and
deleting the one or more expired records if the expired records have not been previously transmitted in an unacknowledged batch to the media publisher.

9. The method as in claim 8, further comprising:
when collecting the one or more stored records for the batch to be transmitted to the media publisher:
retrieving the hash key, the minimum record identifier, the maximum record identifier and the pending list;
recalculating the hash value for each collected record for the batch in order to authenticate the integrity of the event data in each record that is collected for the batch;
comparing the recalculated hash value for each record that is collected for the batch with the corresponding stored hash value in the field for each record, whereby:
assigning each collected record to the batch when the recalculated hash value for the collected record is equal to the corresponding stored hash value in the field for the collected record;
deleting each collected record when the recalculated hash value for the collected record is not equal to the corresponding stored hash value in the field for the collected record;
updating the minimum record identifier to describe a record identifier with a minimum value that is not assigned to the batch; and
updating the pending list to reflect the records assigned to the batch.

10. The method as in claim 9, further comprising:
while deleting the one or more records of the transmitted batch, setting the pending list to null.

11. The method as in claim 1, wherein the audit policy comprises:
a lifetime describing when the audit policy is to be used while tracking by the client application and when the audit policy is no longer to be used; and
an upload interval describing an interval for transmitting batches from the client application to storage associated with the media publisher.

12. A non-transitory computer readable medium comprising executable instructions encoded thereon operable on a computerized device to perform processing, the instructions comprising:
instructions for receiving a media orchestration descriptor, the media orchestration descriptor identifying each segment of a plurality of segments of media content to be received by client application from a media publisher and indicating one or more relationships among the segments to define a visual arrangement and sequence of the segments of the media content;
instructions for receiving an audit policy associated with the media orchestration descriptor and identifying a plurality of events to be tracked, the plurality of events comprising:

a feed event comprising an event at the client application related to a media feed received by the client application from the media publisher, an advertisement event comprising an event at the client application related to one or more advertisements received by the client application, and an interaction event comprising an event at the client application related to one or more interactions received by the client application;

instructions for tracking the plurality of events that occur during presentation of the media content according to the media orchestration descriptor; and instructions for transmitting to the media publisher one or more records of the one or more events occurring during the presentation of the media content.

13. The computer readable medium as in claim 12, wherein the instructions for tracking comprise:

instructions for detecting at least one occurrence of an event identified in the audit policy;

instructions for creating a record for the detected at least one occurrence of the event, the record including event data;

instructions for generating a unique record identifier for the record; and instructions for storing the record, with the unique record identifier, in storage local to the client application.

14. The computer readable medium as in claim 12, wherein the feed event includes at least one of:

a feed subscription event;
a feed unsubscription event;
a check for update event;
a check for update complete event;
a start download event;
a download completed event;
a download error event;

wherein the advertisement event includes at least one of:

a start banner advertisement display event;
a stop banner advertisement display event;
a start in-roll advertisement event;
a midpoint in-roll advertisement event;
a complete in-roll advertisement event;
a start bug advertisement event;
a midpoint bug advertisement event;
a complete bug advertisement event;
a hover-over advertisement event;
a click-on advertisement event; and wherein the interaction event includes at least one of:

a click to play video event;
a video complete event;
a pause video event;
a stop video event;
a drag scrub bar event;
a play video to end event;
a play next video event;
a play previous event;
a mute event;
an unmute event;
a minimize window event; and
a maximize window event.

15. The computer readable medium as in claim 13, wherein the instructions for transmitting to the media publisher one or more records of the one or more events occurring during the presentation of the media content comprise:

instructions for generating a unique application identifier according to a hash function that utilizes characteristics of a computing device executing the client application;

instructions for defining a batch comprising collecting the one or more records in the storage local to the client application for the batch;

instructions for generating a unique batch identifier for the batch;

instructions for transmitting the batch, with the unique batch identifier and the unique application identifier, to the media publisher;

instructions for receiving an acknowledgment from the media publisher to indicate a proper receipt of the batch; and instructions for deleting the one or more records of the transmitted batch from the storage local to the client application in response to receiving the acknowledgment.

16. The computer readable medium as in claim 15, wherein the instructions for defining the batch comprise at least one of:

instructions for defining the batch to include one or more records that were created during a span of time; or instructions for defining the batch to include no more than a pre-determined number of records.

17. The computer readable medium as in claim 13, wherein the instructions for generating the unique record identifier for the record and storing the record, with the unique record identifier, in storage local to the client application comprise:

instructions for generating each unique record identifier according to an order that is incremental, contiguous and ascending;

instructions for maintaining a secure file stored in a database, the secure file associated with the media publisher, and the secure file further comprising:

i) a hash key;

ii) a minimum record identifier, the minimum record identifier describing a record identifier with a minimum value that is stored in the database and has not been transmitted in the batch to the media publisher;

iii) a maximum record identifier, the maximum record identifier describing a record identifier with a maximum value that is stored in the database and has not been transmitted in the batch to the media publisher; and iv) a pending list, the pending list indicating one or more stored records that have been transmitted in an unacknowledged batch to the media publisher.

18. The computer readable medium as in claim 17, further comprising:

instructions for adding a field in the database that is associated with the stored record, the field holding a hash value for the stored record;

instructions for deriving the hash value for the stored record according to the hash key and the event data, the hash value stored in the field; and instructions for updating the maximum record identifier in the secure file to reflect the derived hash value for the stored record whereby:

if the maximum record identifier is a negative value, then updating, in the secure file, both the minimum record identifier and the maximum record identifier with the unique record identifier of the stored record.

19. The computer readable medium as in claim 18, further comprising:

instructions for identifying one or more expired records that are stored in the database;

instructions for updating the minimum record identifier and the maximum record identifier in the secure file to reflect records that have not expired and have not been transmitted in the batch to the media publisher; and instructions for deleting the one or more expired records if the expired records have not been previously transmitted in an unacknowledged batch to the media publisher.

20. The computer readable medium as in claim 19, further comprising instructions for,
when collecting the one or more stored records for the batch to be transmitted to the media publisher:
retrieving the hash key, the minimum record identifier, the maximum record identifier and the pending list;
recalculating the hash value for each collected record for the batch in order to authenticate the integrity of the event data in each record that is collected for the batch;
comparing the recalculated hash value for each record that is collected for the batch with the corresponding stored hash value in the field for each record, whereby the comparing instructions:
assign each collected record to the batch when the recalculated hash value for the collected record is equal to the corresponding stored hash value in the field for the collected record;
delete each collected record when the recalculated hash value for the collected record is not equal to the corresponding stored hash value in the field for the collected record;
update the minimum record identifier to describe a record identifier with a minimum value that is not assigned to the batch; and
update the pending list to reflect the records assigned to the batch.

21. The computer readable medium as in claim 20, further comprising:
instructions for setting the pending list to null while deleting the one or more records of the transmitted batch.

22. The computer readable medium as in claim 12, wherein the audit policy comprises:
a lifetime describing when the audit policy is to be used while tracking by the client application and when the audit policy is no longer to be used; and
an upload interval describing an interval for transmitting batches from the client application to storage associated with the media publisher.

23. A computer system comprising:
a processor;
a memory unit that stores instructions associated with an application executed by the processor; and
an interconnect coupling the processor and the memory unit, enabling the computer system to execute the application and perform operations of:
receiving a media orchestration descriptor identifying each segment of a multi-segment media presentation to be received by a client application and defining a visual arrangement and sequence of the segments of the multi-segment media presentation;
receiving an audit policy associated with the media orchestration descriptor and identifying a plurality of events to be tracked, the plurality of events comprising:
a feed event comprising an event at the client application related to a media feed received by the client application from the media publisher,
an advertisement event comprising an event at the client application related to one or more advertisements received by the client application, and
an interaction event comprising an event at the client application related to one or more interactions received by the client application;
tracking the plurality of events identified in the audit policy that occur during presentation of the media content according to the media orchestration descriptor; and
transmitting to the media publisher one or more records of the one or more events occurring during the presentation of the media content.

* * * * *